H. L. PIGG.

Improvement in Cultivators.

No. 128,653.                          Patented July 2, 1872.

Witnesses.                        Inventor.

UNITED STATES PATENT OFFICE.

HOWARD L. PIGG, OF KNOBNOSTER, MISSOURI, ASSIGNOR TO WILLIAM L. PIGG, (FOR THE USE OF MARY F. PIGG,) OF SAME PLACE.

IMPROVEMENT IN CULTIVATORS.

Specification forming part of Letters Patent No. 128,653, dated July 2, 1872.

Specification describing certain Improvements in Wheel-Cultivators, invented by HOWARD L. PIGG, of Knobnoster, in the county of Johnson and State of Missouri.

My invention consists, first, in a novel mechanism for temporarily lifting the plow-beams with their shovels in passing obstructions or going over from one row of growing crops to another row, which mechanism is obtained by hitching the yoke connecting the plow-beams, by means of suitable connecting-rods, to wrists on the cranks of foot-levers, which, in a state of rest, are supported upon fixed hooks. Second, in combining the mechanism for temporarily lifting the plow-beams with adjustable arms, to which the hooks supporting the cranks of the foot-levers are secured in such a manner that the plow-beams may be permanently sustained in an elevated position, and the depth to which the shovels shall enter the ground be regulated.

Figure 1:
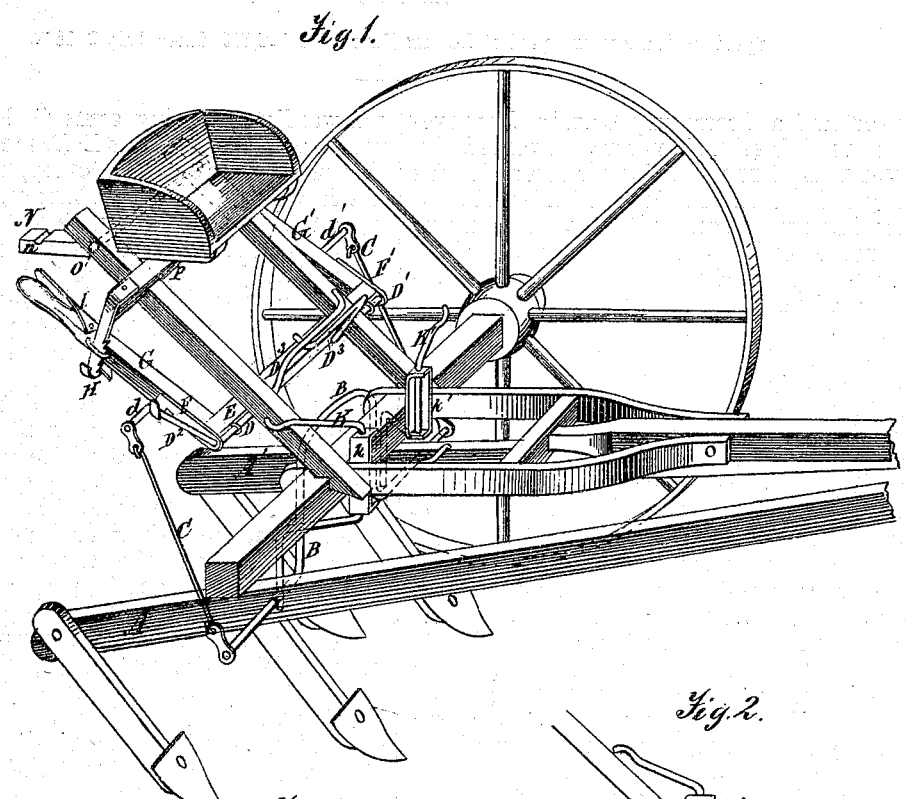
Figure 3:
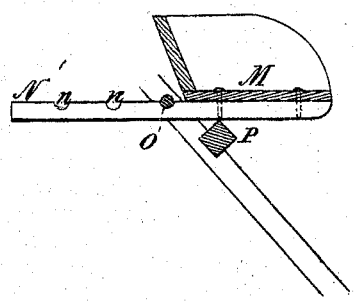
Figure 2:
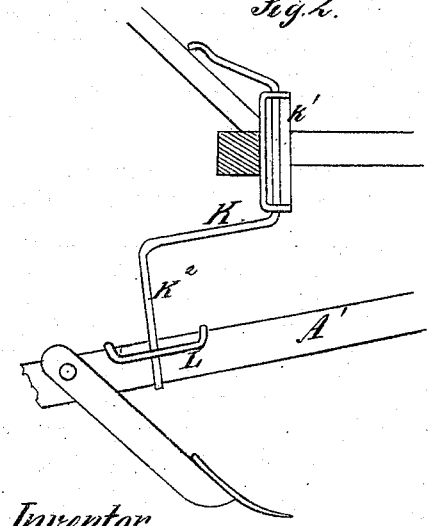

Figure 1 represents a perspective view of a wheel-cultivator embodying my improvements, one of the wheels having been removed for the sake of a clearer illustration of the novel parts. Fig. 2 shows the arrangement of one of the foot-levers for moving the plow-beams laterally. Fig. 3 illustrates the adjustable seat.

The same letters of reference are employed in all the figures in the designation of identical parts.

The plow-beams A A' diverge from their points of attachment to the frame or tongue, and are, near the points where their front standards are secured to them, connected together by the arched bar or yoke B. The ends of the yoke project through the beams, and are linked, by means of connecting-rods or chains C C,' to the outwardly-projecting wrist-pins $d\ d'$ on the cranks $D^2$ of the rock-shafts D and $D^1$. These rock-shafts turn in bearings on a fixed bar, E, of the frame, and terminate at their inner adjacent ends in cranks $D^3$, of suitable construction, to be operated by the feet of the driver. In a state of rest the cranks $D^2$ are supported by fixed hooks F F', which are fastened upon the outer sides of the rearwardly-projecting arms G G'. The foot-pieces of the rock-shafts D $D^1$ are so arranged that they can pass each other, in order that the driver may operate either one of them or both together, as it may be necessary to lift the plow-beams separately or together. The arms G and G' are hinged to the bar E, or other permanent part of the frame, so as to give them sufficient leverage upon the hooks F F', and, by adjusting their rear ends, serve to sustain the plow-beams at the proper points through the intervening devices set forth. These arms oscillate on serrated bars H, and carry spring-pawls I for entering the serrations on the bars, to set the arms at any required elevation thereon. The rear ends of these arms, with their spring-pawls, are in close proximity to the driver's seat, for convenience in raising and lowering them without obliging the driver to leave his seat. The foot-levers for moving the plow-beams laterally consist of the rods K $K^1$, which are bent as shown, and turn in brackets $k\ k'$, permanently secured to the frame. The cranks $K^2$ on the lower ends of these rods rest against staples L, secured on the sides of the plow-beams, and are so disposed as in no way to interfere with the vertical movements of the plow-beams. The driver's seat M is sustained by means of its rearwardly-extending bars N N' between the cross-bars O and P of the frame. In the upper surfaces of the bars N and N' are corresponding transverse grooves $n\ n$ to partly receive the upper bar O of the frame, and thus prevent the slipping out or detachment of the seats. Thus constructed and arranged upon the frame, the seat may be shifted toward or from the foot-levers K and $K^1$, upon which the driver's feet usually rest, so as to be at all times ready to move the plow-beams laterally in following the crookedness of the row of growing plants—to adapt the distance between the two levers and the seat to the stature of the driver.

What I claim as my invention, and desire to secure by Letters Patent, is—

1. The combination of the yoke B connecting the plow-beams, connecting-rods, or chains C C′, cranked rock-shafts D D′, and supporting-hooks F F′, substantially as and for the purpose specified.

2. The combination of the yoke B connecting the plow-beams, connecting rods or chains C C′, cranked rock-shafts D D′, hooks F F′, and adjustable arms G G′, substantially as and for the purpose specified.

In testimony whereof I have signed my name to this specification this 15th day of January, A. D. 1872, in the presence of two attesting witnesses.

HOWARD L. PIGG.

Witnesses:
   J. A. PIGG, SEN.,
   N. BLACKSTOCK.